United States Patent [19]

Watrous et al.

[11] 4,263,543

[45] Apr. 21, 1981

[54] CONTROL CIRCUIT FOR CONTROLLING BATTERY VOLTAGE TRANSITION RATE IN AN AUTOMOTIVE ELECTRICAL SYSTEM

[75] Inventors: Donald L. Watrous, Liverpool; Dwight V. Jones, Baldwinsville; Raymond J. McArthur, Liverpool, all of N.Y.

[73] Assignee: General Electric Company, Schenectady, N.Y.

[21] Appl. No.: 99,217

[22] Filed: Dec. 3, 1979

[51] Int. Cl.$^3$ ............................ H02J 3/00; B60L 1/02
[52] U.S. Cl. ....................................... 322/8; 219/202; 322/28; 320/64
[58] Field of Search .................... 320/5, 39, 40, 64, 68; 322/28, 7, 8; 219/202, 203

[56] References Cited

U.S. PATENT DOCUMENTS

| | | |
|---|---|---|
| 3,440,398 | 4/1969 | Nilssen. |
| 3,525,853 | 8/1970 | Nilssen. |
| 3,858,108 | 12/1974 | Bray ........................................ 322/28 |
| 4,136,311 | 1/1979 | Scheidler ............................... 322/28 |

Primary Examiner—Robert J. Hickey
Attorney, Agent, or Firm—Marvin Snyder; James C. Davis

[57] ABSTRACT

A control circuit employed within an automotive electrical system for controlling the voltage transition rate between battery float and discharge levels in the presence of a switchable coupling between the battery and standard alternator. The control circuit includes means for regulating the alternator output voltage to said battery float level when the battery is coupled to receive charge current from said alternator, and for transforming said alternator output voltage to said discharge level at a predetermined rate prior to the battery coupling being switched to supply current to the load circuit, and further means for transforming said alternator output voltage to said float level at said predetermined rate after said battery coupling being switched to again receive charge current, whereby said predetermined rate provides a gradual change in the energization of said load circuit in the presence of the recited switchable coupling.

15 Claims, 2 Drawing Figures

CONTROL CIRCUIT FOR CONTROLLING BATTERY VOLTAGE TRANSITION RATE IN AN AUTOMOTIVE ELECTRICAL SYSTEM

BACKGROUND OF THE INVENTION

The invention pertains generally to the electrical system of an automotive vehicle and, more particularly, to control circuitry for controlling voltages within such systems in which the vehicle battery is switchably coupled to the electric alternator.

It has been found useful to employ the standard alternator of an automotive electrical system for purposes other than supplying current to the battery and standard automotive load. One improtant use is to energize heating elements embedded within the windshield for deicing purposes. In such application, the alternator output is switchably connected to the battery and heating elements so as to supply a relatively high power to the heating elements during heating, while continuing to perform its prime function of supplying current to the battery and standard load. In this type of operation, during non-heating periods the battery will receive charge current from the alternator, and the voltage across it and the shunt connected load circuit is regulated to the battery fully charged or float voltage. During heating periods the battery will supply some or all of the current requirements of the load, and the voltage across it and the load drops to the battery discharge level. Due to the internal resistance of the battery, the float and discharge voltages differ by several volts. Accordingly, as the alternator is switchably coupled between energizing the battery and energizing the heater elements, the voltage across the battery and standard load changes abruptly between the float and discharge levels. When the headlamps are on, this results in headlamp flare, i.e., a sudden brightening or dimming of the headlamps. In addition, when the blower is on, there is a noticeable change in blower sound.

SUMMARY OF THE INVENTION

It is accordingly an object of the invention to provide a novel and improved control circuit for an automotive electrical system that will avoid abrupt changes in battery voltage in the presence of a switchable coupling between the battery and the standard alternator.

It is a further object of the present invention to provide a control circuit as above described that will avoid headlamp light flare and blower sound flare in the presence of a switchable coupling between the battery and alternator.

It is a further object of the present invention to provide a control circuit as above described that will permit a switchable coupling between the battery and alternator in accordance with a duty cycle operation for a controlled energization by the alternator of an auxiliary load component, such as a heating element, while avoiding abrupt changes in battery voltage.

It is another object of the invention to provide a control circuit as described that controls the battery voltage transition rate between battery float and discharge levels, in the presence of a switchable coupling between the battery and alternator.

With respect to an automotive electrical system that includes an electric alternator of regulated output voltage switchably coupled for supplying energy to the vehicle battery and shunt connected load circuit and to a heating element, these and other objects of the invention are accomplished by a control circuit for controlling the voltage transition rate between battery float and discharge voltage levels comprising: actuator means for providing coupling of the vehicle battery in a first or second mode, said battery receiving charge current from said alternator and being nominally at said float level when coupled in said first mode, and said battery supplying current to said load circuit and being nominally at said discharge level when coupled in said second mode, said actuator means further providing coupling of said heating element with said alternator when said battery is coupled in said second mode. Voltage reference means are included, responsive to said actuator means, for generating a reference voltage waveform composed of successive first and second reference levels transformed from one to the other in accordance with a given ramp characteristic, said first and second reference levels corresponding to said battery float and discharge levels, respectively. Voltage regulator means, responsive to said reference voltage means, regulates the alternator output voltage to said float level when said battery is coupled in said first mode, and transforms said alternator output voltage to said discharge level at a predetermined rate prior to the battery coupling being switched from said first mode to said second mode. The voltage regulator means also transforms said alternator output voltage to said float level at said predetermined rate after said battery coupling being switched from said second mode to said first mode, whereby said predetermined rate provides a gradual change in the energization of said load circuit when switching said battery coupling between said first and second modes.

BRIEF DESCRIPTION OF THE DRAWINGS

While the specification concludes with the claims which particularly point out and distinctly claim that subject matter which is regarded as inventive, it is believed the invention will be more clearly understood when considering the following detailed description taken in connection with the accompanying figures of the drawings, in which:

DESCRIPTION OF THE PREFERRED EMBODIMENT

Figure 1:
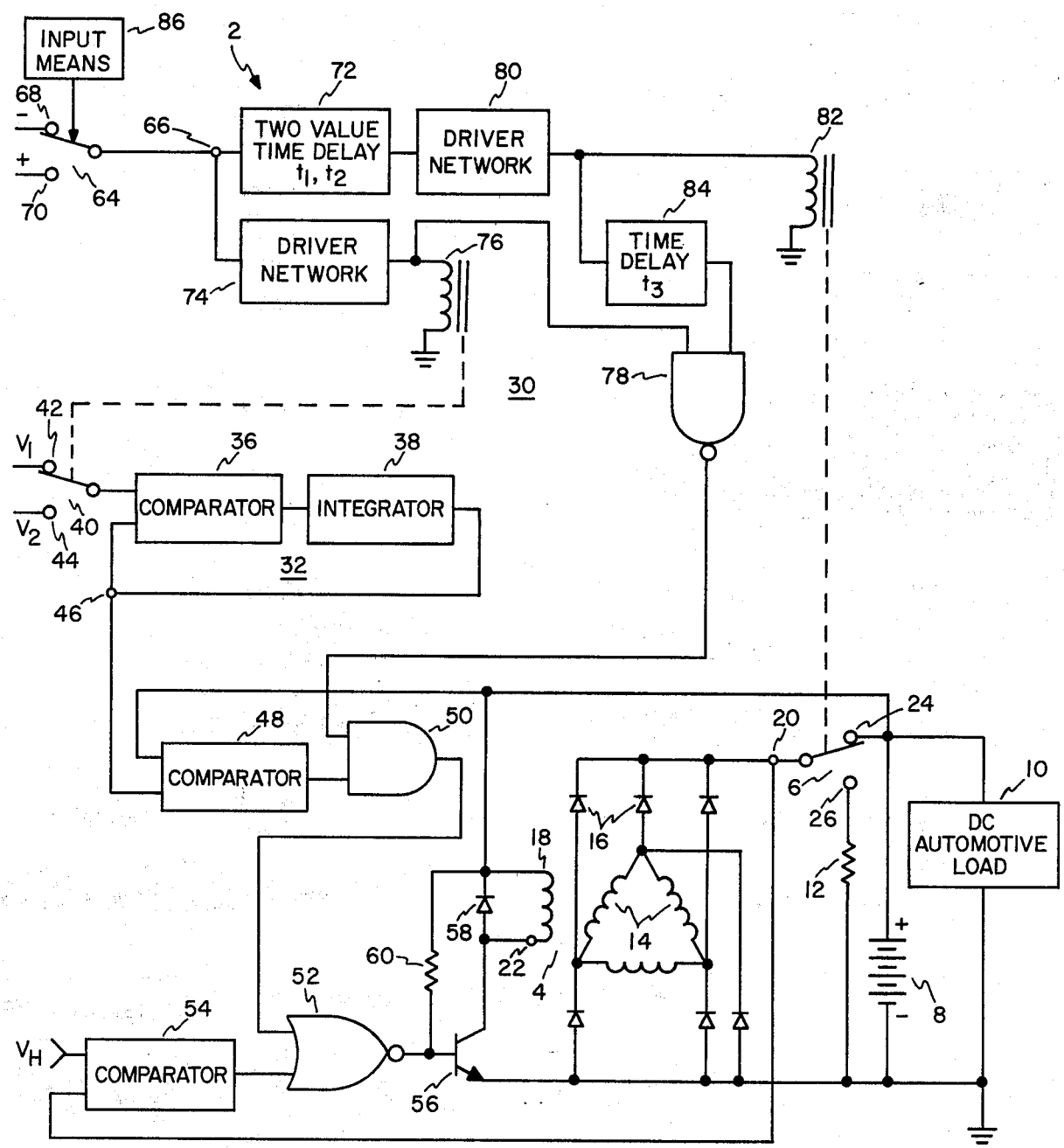
FIG. 1 is a schematic block diagram of a control circuit in accordance with the invention as employed within an automotive electrical system.

With reference to FIG. 1 of the drawing, there is illustrated a schematic block diagram of the inventive control circuit 2 embodied in an automative electrical system which includes an electric alternator 4, the voltage regulated output of which is selectively coupled by a switching device 6 for energizing a vehicle battery 8 and DC automotive load circuit 10 connected in shunt, therewith, and a resistive heating element 12. Briefly, control circuit 2 acts to regulate the output voltage of alternator 4 to a battery float level when the alternator is coupled for supplying charge current to battery 8 and for energizing load circuit 10, and to transform the alternator output voltage at a predetermined rate to a battery discharge level immediately prior to the alternator output being switched to energize resistive heating element 12. The float and discharge levels are nominal voltage levels of the battery when being charged by the alternator on the one hand, and supplying current to the load circuit on the other hand. Further, the control circuit regulates the alternator output voltage to an elevated voltage level when the alternator output energizes the heating element and serves to transform the output voltage from the elevated level to the discharge level at the end of the heating cycle and from the discharge level to the float level at said predetermined rate immediately after the alternator output being switched from said resistive heating element to said battery and load circuit. The referred to predetermined rate is of a value that provides a sufficiently gradual change in voltage across the load circuit when switching between battery charge and discharge conditions so as to avoid discernible disturbances in load operation, such as headlamp light light flare or blower sound flare.

The alternator 4 may be a standard component, schematically represented in a simplified form to comprise delta configured stator windings 14 constructed integrally with a diode network including diode elements 16, a rotor field winding 18, an output terminal 20 and a field winding terminal 22. In the alternator operation, current flowing in the field winding 18, which is rotatably driven by the vehicle engine shaft, not shown in the drawing, generates an AC voltage in the stator windings 14 that is proportional to the field current magnitude and shaft RPM. This AC voltage is rectified by the diode network to appear as a substantially DC voltage in output voltage terminal 20 of alternator 4.

Output terminal 20 is coupled to a movable contact of switching device 6, schematically shown as a mechanical switch having two fixed contacts 24 and 26. When contact 24 is engaged, which is the normal switch position, the alternator is employed to supply current to battery 8 and to DC automotive load 10, the shunt connection of which is coupled between contact 24 and ground. When contact 26 is engaged, which is generally for limited heating periods, the alternator is employed to supply power to resistive heating element 12 which is coupled between contact 26 and ground. It may be appreciated that the battery supplies the current requirements of the load current during the heating periods.

Figure 2:
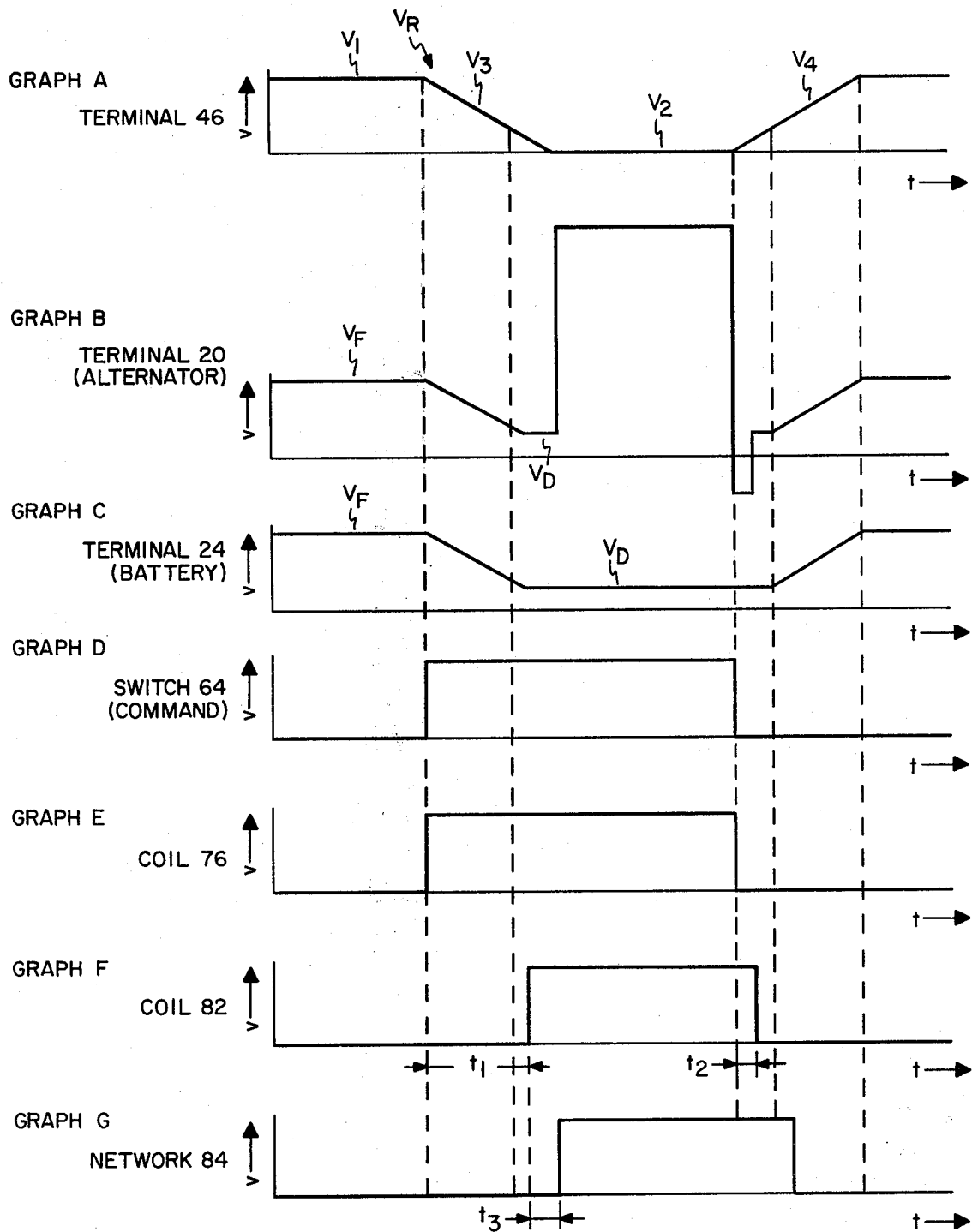
FIG. 2 is a series of graphs illustrating voltage waveforms useful in describing the operation of the inventive control circuit of FIG. 1.

Control circuit 2 comprises as its principal components an actuator 30, a voltage reference source 32 and a voltage regulator 34. The voltage reference source 32 generates a reference voltage waveform $V_R$ which, as shown in graph A of FIG. 2, is composed of a first reference level $V_1$, corresponding to the battery float voltage, and a second reference level $V_2$, corresponding to the battery discharge voltage. As will be further explained, the second reference level $V_2$ is preferably set slightly lower than the nominal discharge voltage of the battery so that the most extreme discharge conditions can be accommodated. There voltage levels are transformed from one to the other in accordance with a given ramp characteristic of absolute value $\Delta V/\Delta T$, where $\Delta V$ is the difference between $V_1$ and $V_2$ and $\Delta T$ is the time for making the transformation. In a typical operation $\Delta V$ may be equal to several volts and $\Delta T$ may be equal to several seconds. As shown in graph A of FIG. 2, the waveform includes a descending ramp voltage $V_3$ and an ascending ramp voltage $V_4$ each with a slope of absolute value $\Delta V/\Delta T$. The reference voltage waveform is generated by a first comparator network 36 and integrator network 38, one input terminal of comparator 36 being coupled to a switching device 40, schematically shown as a mechanical switch having a movable contact and two fixed contacts 42 and 44. Contact 42 is coupled to a source of reference voltage $V_1$, and contact 44 is coupled to a source of reference voltage $V_2$. The output of comparator 36 is coupled to the input of integrator 38, the output of which is coupled to the second input terminal of comparator 36 so as to appear at output terminal 46 as the reference voltage waveform.

Terminal 46 is also coupled to one input terminal of a second comparator network 48 of the voltage regulator 34, to the second input of which is coupled the voltage appearing across the battery 8 and load 10. The output of comparator 48 is coupled to a first input of a digital AND network 50, which in turn is coupled to a digital inverting OR network 52. A third comparator network 54 has a constant reference voltage $V_H$ of elevated level coupled to one input thereof and the voltage at terminal 20 coupled to its second input, the output of comparator 54 also being applied to the OR network. The output of OR network 52 is coupled to a field current control device, illustrated as an NPN transistor 56 having its collector coupled to field winding terminal 22 and through a diode 58 to terminal 24 for providing a free wheeling path for transient field currents. The emitter of transistor 56 is coupled to ground and the base is coupled through a bias resistor 60 to terminal 24 and to the output of OR network 52. As will be described, the OR network is responsive to the outputs from comparators 48 and 54 to provide a turn off voltage to transistor 56 for controlling conduction and the field current and therefore the output voltage of alternator 4.

Actuator 30 includes a command switching device 64, schematically illustrated as a mechanical switch having a movable contact coupled to an input terminal 66 and two fixed contacts 68 and 70 coupled to a pair of voltages representing digital inputs of "0" and "1", respectively. Thus, contact 68 may be coupled to a negative DC voltage or ground and contact 70 may be coupled to a positive DC voltage, as shown in graph D of FIG. 2. As will be further described, engaging contact 68 directs the system to provide charge current to the battery and engaging contact 70 directs the system to energize the heating element. Terminal 66 is coupled to the input of a two value time delay network 72, and to the input of a first driver network 74 which energizes a relay coil 76 for operating the movable contact of switch 40, and which generates a corresponding digital signal that is applied as a first input to an inverting AND gate 78. Time delay network 72, exhibiting a delay of $t_1$ for the positive input and a delay of $t_2$ for the negative input, has its output coupled to a second driver network 80 which energizes a relay coil 82 for operating the movable contact of switch 6. The output of driver network 80 also generates a corresponding digital signal that is coupled to a further time delay network 84 of delay $t_3$. The output of network 84 is applied as a second input to AND network 78, whose output is applied as a second input to AND network 50. An input means schematically represented by a block 86 controls the operation of the movable contact of switch 64. The input means can comprise a form of well known logic circuitry for providing various operations of the system including the engagement of either of contacts 68 or 70 for extended periods providing either a discrete battery charge or heater energization, or the alternate engagement of these contacts in accordance with a given duty cycle operation for providing a reduced energization of the heater element. Block 86 may also represent a simple manual operation for actuating the circuit.

Considering the general operation of the system of FIG. 1, the switching device 6 places the battery in either a charge condition, when engaging contact 24, or a discharge condition, when engaging contact 26. In the charge condition the battery voltage is nominally at a float level, and in the discharge condition the battery is nominally at a discharge level. Due to the interval resistance of the battery, these levels are several volts apart. For a typical battery, the float voltage is about 14.4 v and the discharge voltage is about 11 v.

The comparator networks are conventional circuit components for comparing two applied input signals and providing an output signal in accordance with the relative magnitude of the input signals. They may comprise either analog or digital circuits, or a combination of the two. In the exemplary embodiment of the invention being considered, they comprise primarily digital circuitry preceded by analog to digital conversion circuitry for operating on the analog inputs. They accordingly generate one of two digital output signals in accordance with which of the reference signal or the second signal inputs is the greater. In addition, since the second signals applied to the comparators are of an increasing and decreasing nature, the comparators are designed preferably to exhibit a well known hysteresis characteristic whereby their output state changes at one level of an increasing second signal that is slightly higher than the reference signal and at a different level of a decreasing second signal that is slightly lower than the reference signal.

When switch 6 is connected to contact 24 for supplying standard load and battery currents, the battery voltage, which is at the float level, is applied to comparator 48 to be compared with the reference voltage waveform $V_R$ from terminal 46. Assuming the battery voltage to be of less magnitude than the instantaneous value of waveform $V_R$, the comparator generates a disabling output, e.g., a binary "0", that fails to enable OR network 52. With OR network 52 in the disabled state, a control voltage is applied to transistor 56 for keeping it turned on and conducting field current in field winding 18 of the alternator. The conduction of field current acts to increase the alternator voltage and when the sensing voltage at contact 24 exceeds reference waveform $V_R$ by a small amount, determined by the hysteresis characteristic of comparator 48, the comparator output changes state to generate an enabling output, e.g., a binary "1", that under the control of AND gate 50 enables OR network 52. In the enabled state, a control voltage, normally ground, is applied to transistor 56 for turning it off and cutting off the conduction of field current which decreases the alternator voltage. Since the field current cannot be changed abruptly due to inductive effects, the field current will decay through diode 58. When the battery voltage falls below reference waveform $V_R$ by a slight amount, the comparator 48 output again changes state for disabling the OR network and permitting the conduction of field current through transistor 56. Accordingly, a duty cycle control is effected for field current conduction which maintains the alternator output within a narrow band of voltages corresponding to reference voltage waveform $V_R$ for as long as the AND network 50 is enabled by actuator 30.

With switch 6 at contact 24, the battery voltage is also coupled to comparator 54. However, because reference voltage $V_H$ is of substantially higher level than the battery voltage, comparator 54 generates only a disabling output and therefore does not enter into the control process.

For a heating operation, switch 6 engages contact 26 and the alternator output voltage across heating element 12 is applied to comparator 54 to be compared with reference voltage $V_H$. Operating in similar manner as comparator 48, when the alternator voltage is generally less than $V_h$, comparator 54 generates a disabling output that is coupled directly to OR network 52 for conducting field current through transistor 56. When the alternator voltage is generally greater than $V_H$, the comparator generates an enabling output to the OR network for terminating field current through the transistor, whereby the alternator output will be maintained within a narrow band of voltages corresponding to reference voltage $V_H$. During this sequence of the operation, battery 8 supplies current to the automotive load 10 and the battery voltage, which is at the discharge level, is applied to comparator 48 with a magnitude ordinarily less than waveform $V_R$ for generating a disabling output and to be out of the control process.

With respect to the operation of the control circuit 2 in controlling the battery voltage transition rate as the battery is switched between charge and discharge conditions, it will be assumed that the battery is initially in the charge condition. Command switch 64 engages contact 68 resulting in relay coils 76 and 82 being in their de-energized state and switching devices 40 and 6 being in their normal state engaging contacts 42 and 24, respectively. In this condition, the reference voltage waveform $V_R$ at terminal 46 is at reference level $V_1$, as shown in graph A of FIG. 2, and is applied to regulator 34 for maintaining the alternator output and battery voltages at the float level $V_F$, as shown in graphs B and C of FIG. 2. Coils 76 and 82 and the output of time delay network 84 are at ground, as shown in graphs E, F and G, respectively, of FIG. 2.

Should now command switch 64 be made to engage contact 70 to initiate a heating operation, coil 76 is instantly energized to being switch 40 into engagement with contact 44. This generates an output signal from comparator 36 which upon integration by integrator 38 generator at terminal 46 a descending ramp voltage $V_3$ at terminal 46 that extends to reference level $V_2$, as shown by graph A. As the magnitude of reference waveform $V_R$ is reduced in accordance with the ramp function, the regulator 34 acts to correspondingly reduce the voltage at terminal 20 and across the battery to the discharge voltage $V_D$, as shown by graphs B and C. During this time and throughout the time that reference waveform $V_R$ is at level $V_1$, AND network 78 is disabled and, through its inverting action, provides an enabling input to AND network 50. After a delay of $t_1$, provided by network 72, great enough for the battery voltage to reach the discharge voltage $V_D$, coil 82 is energized to bring switch 6 into engagement with contact 26. At the moment of switching, the alternator output current has been reduced to zero which facilitates the switching action and prevents arcing across the switch contacts when a mechanical switch construction is employed. The reference waveform is reduced to reference level $V_2$. A first enabling input is applied to network 78 when coil 76 is energized. After a further delay of $t_3$ provided by network 84, a second enabling input is applied to network 78, which results in the disabling of AND network 50. At this moment, comparator 54 enters the control process for regulating the alternator output voltage to the elevated reference level $V_H$.

Upon the command switch 64 once more engaging contact 68 for again charging the battery, the coil 76 is instantly de-energized to bring switch 40 into engagement with contact 42. This generates an output signal from comparator 36 that is integrated to generate an ascending ramp voltage $V_4$ at terminal 46 that extends to reference level $V_1$, as shown by graph A. The change in output state of driver network 74 also applies a disabling input to AND network 78, which acts to enable AND network 50 and once more introduce comparator 48 into the control process. At this time the magnitude of the reference waveform $V_R$ is less than the battery discharge voltage so that the regulator, under the operation of comparator 48, rapidly reduces the alternator voltage output, as schematically shown by graph B. After a short delay of $t_2$, which ensures that the alternator output current is zero, coil 82 is de-energized to bring switch 6 again into engagement with contact 24, which abruptly raises the alternator output voltage to the battery discharge level. As before, switching is accomplished during a zero current condition at the alternator output. Upon the magnitude of the reference voltage waveform $V_R$ exceeding the discharge voltage across the battery, the regulator causes the alternator voltage at terminal 20 and the battery voltage to follow the reference voltage up the ramp, as shown by graphs B and C, to again be regulated to the float voltage $V_F$.

While the invention has been described with reference to a specific embodiment, it may be appreciated that numerous modifications can be made to the disclosed circuitry by those skilled in the art without exceeding the basic teachings herein set forth. In this context, the switching devices 6 and 40 can be readily implemented in a semiconductor form under the control of switching signals generated by the actuator circuit 30. The appended claims are intended to include within their meaning modifications such as this and any other that fall within the true scope and spirit of the invention.

What we claim as new and desire to secure as Letters Patent of the United States is:

1. In an automotive electrical system that includes an electrical alternator of regulated output voltage that is selectively coupled to energize the vehicle battery and shunt connected load circuit, a control circuit for controlling the voltage transition rate between battery float and discharge voltage levels, comprising:
   (a) actuator means for providing coupling of the vehicle battery in a first or second mode, said battery receiving charge current from said alternator and being nominally at said float level when coupled in said first mode, and said battery supplying current to said load circuit and being nominally at said discharge level when coupled in said second mode,
   (b) voltage reference means, responsive to said actuator means, for generating a reference voltage waveform composed of successive first and second reference levels transformed from one to the other in accordance with a given ramp characteristic, said first and second reference levels corresponding to said battery float and discharge levels, respectively, and
   (c) voltage regulator means, responsive to the reference waveform of said reference voltage means, for regulating the alternator output voltage to said float level when said battery is coupled in said first mode, for transforming said alternator output voltage to said discharge level at a predetermined rate prior to the battery coupling being changed from said first mode to said second mode, and for transforming said alternator output voltage to said float level at said predetermined rate after said battery coupling being changed from said second mode to said first mode, whereby said predetermined rate provides a gradual change in the energization of said load circuit when changing said battery coupling between said first and second modes.

2. A control circuit as in claim 1 wherein said actuator means includes first driver means for establishing the reference voltage waveform at said first or second reference level, and second driver means for providing coupling of said battery in said first or second mode to correspond with the establishment of said first and second reference levels, respectively.

3. A control circuit as in claim 2 wherein said second driver means includes delay means for delaying the establishment of the second coupling mode with respect to the establishment of said second reference level, the delay of said delay means being sufficient to allow transformation from said first to said second reference levels, and for delaying the establishment of said first reference level with respect to the establishment of the first coupling mode.

4. A control circuit as in claim 3 wherein said voltage reference means includes comparator means and integrator means coupled in tandem, voltages at said first and second reference levels being controllably coupled as a first input to said comparator means and the output of said integrator means being coupled as a second input to said comparator means and providing said reference voltage waveform.

5. A control circuit as in claim 4 wherein said voltage regulator means includes further comparator means, responsive to said reference voltage waveform and to said alternator output voltage, for supplying a regulator signal to regulate said alternator output voltage.

6. A control circuit as in claim 5 wherein said actuator means includes means for providing alternate coupling of said battery between said first and second modes in accordance with a controlled duty cycle operation.

7. In an automotive electrical system that includes an electric alternator of regulated output voltage that is selectively coupled to energize the vehicle battery and shunt connected load circuit, a control circuit for controlling the voltage transition rate between battery float and discharge voltage levels, comprising:
   (a) first means for regulating the alternator output voltage to said battery float level when the vehicle battery is coupled in a first mode in which said battery receives charge current from said alternator, and for transforming said alternator output voltage to said discharge level at a predetermined rate prior to the battery coupling being changed from said first mode to a second mode in which said battery supplies current to said load circuit, and
   (b) second means for transforming said alternator output voltage to said float level at said predetermined rate after said battery coupling being changed from said second mode to said first mode, whereby said predetermined rate provides a gradual change in the energization of said load circuit when changing said battery coupling between said first and second modes.

8. A control circuit as in claim 7 wherein said first and second means include voltage reference means for generating a reference voltage waveform composed of successive first and second reference levels transformed from one to the other in accordance with a given ramp characteristic corresponding to said predetermined rate, said first and second reference levels corresponding to said battery float and discharge levels, respectively.

9. A control circuit as in claim 8 further comprising means for providing coupling of said battery between said first and second modes in accordance with a controlled duty cycle operation.

10. In an automotive electrical system that includes an electric alternator of regulated output voltage that is switchably coupled for supplying energy to the vehicle battery and shunt connected load circuit and to a heating element, a control circuit for controlling the voltage transition rate between battery float and discharge voltage levels, comprising:

(a) actuator means for providing coupling of the vehicle battery in a first or second mode, said battery receiving charge current from said alternator and being nominally at said float level when coupled in said first mode, and said battery supplying current to said load circuit and being nominally at said discharge level when coupled in said second mode, said actuator means further providing coupling of said heating element with said alternator when said battery is coupled in said second mode, (b) voltage reference means, responsive to said actuator means, for generating a reference voltage waveform composed of successive first and second reference levels transformed from one to the other in accordance with a given ramp characteristic, said first and second reference levels corresponding to said battery float and discharge levels, respectively, and (c) voltage regulator means, responsive to said reference voltage means, for regulating the alternator output voltage to said float level when said battery is coupled in said first mode, for transforming said alternator output voltage to said discharge level at a predetermined rate prior to the battery coupling being switched from said first mode to said second mode, and for transforming said alternator output voltage to said float level at said predetermined rate after said battery coupling being switched from said second mode to said first mode, whereby said predetermined rate provides a gradual change in the energization of said load circuit when switching said battery coupling between said first and second modes.

11. A control circuit as in claim 10 wherein said actuator means includes first driver means for establishing the reference voltage waveform at said first or second reference level, and second driver means for providing coupling of said battery in said first or second mode to correspond with the establishment of said first and second reference levels, respectively, said second driver means including delay means for delaying the establishment of the second coupling mode with respect to the establishment of said second reference level, the delay of said delay means being sufficient to allow transformation from said first to said second reference levels, and for delaying the establishment of said first reference level with respect to the establishment of the first coupling mode.

12. A control circuit as in claim 11 wherein said voltage reference means includes first comparator means and integrator means coupled in tandem, voltages at said first and second reference levels being controllably coupled as a first input to said comparator means and the output of said integrator means being coupled as a second input to said comparator means and providing said reference voltage waveform, and wherein said voltage regulator means includes second comparator means, responsive to said reference voltage waveform and to said alternator output voltage, for supplying a first regulator signal to regulate said alternator output voltage.

13. A control circuit as in claim 12 wherein said actuator means includes means for providing alternate coupling of said battery between said first and second modes in accordance with a controlled duty cycle operation, whereby there results a controlled energization of said heating element.

14. A control circuit as in claim 13 which comprises a further voltage reference means of elevated reference level and wherein said voltage regulator means includes third comparator means, responsive to the elevated reference level of said further voltage reference means and to said alternator output voltage, for supplying a second regulator signal to regulate said alternator output voltage.

15. A control circuit as in claim 14 wherein said voltage regulator means includes gating means responsive to the output of said second and third comparators and to said actuator means for supplying only one of said first or second regulator signals to regulate said alternator output voltage.

* * * * *